US008112273B2

(12) United States Patent
James et al.

(10) Patent No.: US 8,112,273 B2
(45) Date of Patent: *Feb. 7, 2012

(54) VOICE ACTIVITY DETECTION AND SILENCE SUPPRESSION IN A PACKET NETWORK

(75) Inventors: James H. James, Farmingdale, NJ (US); Joshua Hal Rosenbluth, Middletown, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 79 days.

This patent is subject to a terminal disclaimer.

(21) Appl. No.: 12/647,863

(22) Filed: Dec. 28, 2009

(65) Prior Publication Data

US 2010/0106491 A1    Apr. 29, 2010

Related U.S. Application Data

(63) Continuation of application No. 11/773,699, filed on Jul. 5, 2007, now Pat. No. 7,664,646, which is a continuation of application No. 10/330,957, filed on Dec. 27, 2002, now Pat. No. 7,272,552.

(51) Int. Cl.
    *G10L 15/20* (2006.01)

(52) U.S. Cl. ........ 704/233; 704/226; 704/228; 704/215; 704/201; 455/570; 379/406.02; 379/388.02; 370/260; 370/352

(58) Field of Classification Search .................. 704/226, 704/215, 233, 210, 207, 201; 370/260, 466, 370/352, 356; 455/570; 379/347, 400, 406.02, 379/388.02, 406.03
See application file for complete search history.

(56) References Cited

U.S. PATENT DOCUMENTS

| | | | |
|---|---|---|---|
| 5,774,849 A * | 6/1998 | Benyassine et al. | 704/246 |
| 5,809,460 A * | 9/1998 | Hayata et al. | 704/225 |
| 5,897,613 A | 4/1999 | Chan | |
| 5,991,718 A * | 11/1999 | Malah | 704/233 |
| 6,001,131 A * | 12/1999 | Raman | 704/226 |
| 6,061,647 A * | 5/2000 | Barrett | 704/208 |
| 6,188,981 B1 * | 2/2001 | Benyassine et al. | 704/233 |
| 6,243,366 B1 | 6/2001 | Bradley et al. | |
| 6,360,265 B1 | 3/2002 | Falck et al. | |
| 6,526,140 B1 | 2/2003 | Marchok et al. | |
| 6,535,844 B1 * | 3/2003 | Wood et al. | 704/210 |
| 6,643,617 B1 | 11/2003 | Wood et al. | |
| 6,707,821 B1 | 3/2004 | Shaffer et al. | |
| 7,002,913 B2 * | 2/2006 | Huang et al. | 370/230.1 |

(Continued)

OTHER PUBLICATIONS

Daniel Collins, "Carrier Grade Voice Over IP", McGraw-Hill, New York, San Francisco, Washington DC, 2001.

(Continued)

*Primary Examiner* — Vijay B Chawan

(57) ABSTRACT

The present invention is a system and method that improves upon voice activity detection by packetizing actual noise signals, typically background noise. In accordance with the present invention an access network receives an input voice signal (including noise) and converts the input voice signal into a packetized voice signal. The packetized voice signal is transmitted via a network to an egress network. The egress network receives the packetized voice signal, converts the packetized voice signal into an output voice signal, and outputs the output voice signal. The egress network also extracts and stores noise packets from the received packetized voice signal and converts the packetized noise signal into an output noise signal. When the access network ceases to receive the input voice signal while the call is still ongoing, the access network instructs the egress network to continually output the output noise signal.

16 Claims, 1 Drawing Sheet

U.S. PATENT DOCUMENTS

| | | |
|---|---|---|
| 7,012,901 B2 * | 3/2006 | Jagadeesan et al. .......... 370/260 |
| 7,161,931 B1 * | 1/2007 | Li et al. .................. 370/352 |
| 7,230,955 B1 * | 6/2007 | James et al. ............... 370/466 |
| 7,272,552 B1 * | 9/2007 | James et al. ............... 704/215 |
| 7,573,907 B2 * | 8/2009 | Lakaniemi ................ 370/468 |
| 7,664,646 B1 * | 2/2010 | James et al. .............. 704/270.1 |
| 2002/0006137 A1 | 1/2002 | Rabenko et al. |
| 2002/0118650 A1 * | 8/2002 | Jagadeesan et al. .......... 370/260 |
| 2003/0055627 A1 | 3/2003 | Balan |
| 2003/0063578 A1 | 4/2003 | Weaver |
| 2003/0067922 A1 | 4/2003 | Yoshantani |
| 2006/0069551 A1 | 3/2006 | Chen et al. |
| 2007/0127711 A1 * | 6/2007 | LeBlanc ................ 379/406.16 |
| 2009/0265169 A1 * | 10/2009 | Dyba et al. ................. 704/233 |

OTHER PUBLICATIONS

"A Silence Compression Scheme for G.729 Optimized for Terminals Conforming to Recommendation V.70," Series G: Transmission Systems and Media, Digital Transmission Systems—Terminal Equipments—Coding of Analogue Signals by Methods Other Than PCM, Coding of Speech at 8 kbit/s Using Congugate Structure Algebraic-Code-Excited Linear-Prediction (CS-ACELP), ITU-T Recommendation G.729—Annex B, Nov. 1996.

* cited by examiner

VOICE ACTIVITY DETECTION AND SILENCE SUPPRESSION IN A PACKET NETWORK

The present application is a continuation of U.S. patent application Ser. No. 11/773,699, filed Jul. 5, 2007, which is a continuation of U.S. patent application Ser. No. 10/330,957, filed Dec. 27, 2002, now U.S. Pat. No. 7,272,552, which are incorporated herein by reference in their entirety.

CROSS REFERENCE TO RELATED APPLICATIONS

This application claims the benefit of the following application: System and Method for Improved Use of Voice Activity Detection, Ser. No. 10/331,013, filed Dec. 27, 2002, now U.S. Pat. No. 7,230,955, and Ser. No. 11/742,096, filed Apr. 30, 2007.

FIELD OF THE INVENTION

This invention relates generally to telecommunications. More particularly, this invention relates to the improved use of voice activity detection/silence suppression technology.

BACKGROUND OF THE INVENTION

Network providers, like AT&T, are continually working to improve network efficiency. Consider a typical transmission from a calling party to called party in which voice signals, accompanied by noise, are transmitted. The noise component considered in this application is primarily the background noise of the speaking party. During this typical transmission there are periods of time when the calling party is not speaking but the background noise is still present. Even though no voice signal is being transmitted, the network is still committing the same amount of resources, and transmitting solely the noise signal. Conventional technology has made the network more efficient by reducing the amount of resources allocated to such a transmission during periods of "silence," i.e., when only a noise signal is present, so that the bandwidth can be used for other transmissions.

Conventional technology detects a voice signal in a transmission. This technology, referred to as voice activity detection (VAD) or silence suppression (SS), determines whether an input signal is primarily a voice signal or a noise signal based on one or more parameters. This decision may be based on the current frame as well as a few of the preceding frames, to ensure that there is a significant break in the input voice signal. When the VAD/SS technology determines that no input voice signal is being transmitted, i.e., that just noise is present, instead of using a suitable amount of bandwidth for the particular transmission, the VAD/SS technology informs the receiving end that no signal is going to be transmitted. The VAD/SS technology sends one or more bits, referred to as silence insertion descriptors, that are noise characteristics. The VAD/SS technology, instead of transmitting the noise, or the "lack of voice" over the bandwidth, allocates the bandwidth to another use. At the receiving end, the silence insertion descriptors are converted into a representation of the background noise, also known as comfort noise, representation and transmitted to the called party.

In the event that the silence period continues for some time, and there is no significant change in the background noise, then the comfort noise is continually generated. However, if there is a change in the background noise, new silence insertion descriptors will be transmitted to the receiving end. This process avoids a comfort noise that is constant for the benefit of the listener.

Although there is bandwidth savings with this technology, suppressing silence in a transmission has another associated characteristic. Suppressing the silence "degrades" the quality of the connection. The parties participating in the transmission become familiar with each voice and the associated background noise. During periods of silence when the silence suppression system either transmits no signal or silence insertion descriptors, the parties will hear a difference in background noise, i.e., either no noise at all or a slightly different background noise. Noise pumping refers to the different sounds created when switching between the presence of noise and absence of noise. Noise contrast refers to the different sounds created when switching between the presence of actual noise and the presence of comfort noise. As noted above, the comfort noise results when the silence insertion descriptors are converted into a noise signal, and this noise is generally not identical to the actual noise. Both the noise pumping and the noise contrast yield audible distinctions that are apparent and undesirable to the parties.

Network providers, like AT&T, are interested in using network bandwidth efficiently. This is especially important where bandwidth is limited, such as sub-oceanic fiber cable transmissions given the large cost to place the cable. Network providers are also interested in providing the best quality transmissions possible. Thus, given the foregoing, there is a need in the industry to maintain the bandwidth savings using silence suppression techniques while improving the quality of the signal to the users.

BRIEF SUMMARY OF THE INVENTION

Limitations of the prior art are overcome and a technical advance is made in accordance with the present invention, illustrative embodiments of which are described below.

In general, the present invention is a method and apparatus for improved silence suppression by packetizing voice signals received by an access gateway from a speaking party and transmitting these packetized voice signals via a network to an egress gateway. The egress gateway converts the packetized voice signal into voice signals suitable for output and transmits the output voice signals to a listening party. The invention also includes packetizing actual noise signals, typically background noise, received by an access gateway from a speaking party and transmitting these packetized noise signals via a network to an egress gateway. The egress gateway converts the packetized noise signal into noise signals suitable for output and transmits the output noise signals to a listening party. When the access gateway detects that no voice signal is being received and only a noise signal is being received for a predetermined period of time, the access gateway instructs the egress network to continually transmit output noise signals to the listening party and ceases to transmit packetized noise signals to the egress gateway.

In accordance with aspects of one illustrative embodiment, a silence suppression system is disclosed comprising an access gateway, including an access silence suppressor, a network, and an egress gateway, including an egress silence suppressor. The access gateway receives an input voice signal, that includes noise, and also received an input noise signal, that includes no voice. The access gateway packetizes the input voice signal and transmits the packetized voice signal over a network. The access gateway also packetizes the input noise signal and transmits the packetized noise signal over the network. An egress gateway receives the packetized voice signal, converts the packetized voice signal into an output voice signal, and outputs the output voice signal. The egress gateway also receives the packetized noise signal, converts the packetized noise signal into an output noise signal, and outputs the output noise signal. After a predetermined amount of time, if the access gateway continually receives the input noise signal, and not the input voice signal, the access gateway ceases to transmit the packetized noise signal through the network and instructs the egress gateway to continually output the output noise signal.

In an alternative embodiment, the present invention is a silence suppression system for a telephone call that includes an access network, including an access silence suppressor, a network, and an egress network, including an egress silence suppressor. The access network receives an input voice signal (including noise) and converts the input voice signal into a packetized voice signal. The packetized voice signal is transmitted via a network to the egress network. The egress network receives the packetized voice signal, converts the packetized voice signal into an output voice signal, and outputs the output voice signal. The egress network also extracts and stores noise packets from the received packetized voice signal and converts the packetized noise signal into an output noise signal. When the access network ceases to receive the input voice signal while the call is still ongoing, the access network instructs the egress network to continually output the output noise signal.

BRIEF DESCRIPTION OF THE DRAWING

The present invention will be more fully understood by reading the following detailed description in conjunction with the drawing, in which.

DETAILED DESCRIPTION OF THE INVENTION

Figure 1:
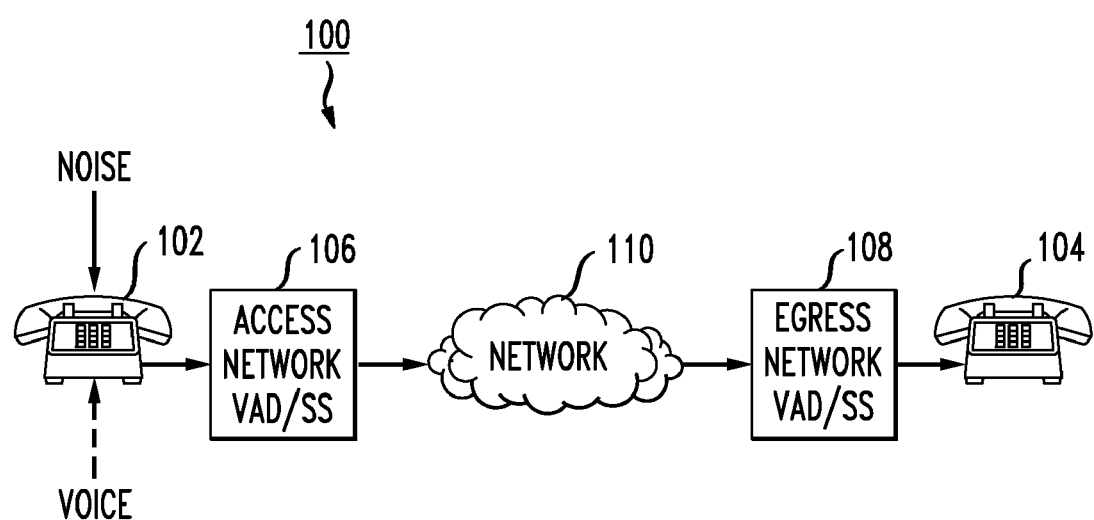
FIG. 1 is a block diagram of a telephone system illustrating the present invention.

FIG. 1 represents a telephone system 100 connecting a calling party 102 and a called party 104. Calling party 102 places a telephone call to called party 104 by dialing a number as is well known in the art. The present invention is applicable for voice transmissions of a variety of different formats besides the traditional analog format, including Voice over Internet Protocol (VoIP), Voice over Frame, Voice over ATM and the like. Once the connection is complete, if appropriate given the particular telephone system, the voice signal from calling party 102 is packetized by access network or gateway 106. The voice signal, in its packetized version, is transmitted through network 110 and is received at egress network or gateway 108. Within egress network 108, the voice signal is converted from a packetized signal into a voice signal. The voice signal is then transmitted to its termination point, called party 104.

More specifically, calling party 102 places a telephone call to called party 104 and the connection is established. Calling party 102 speaks a voice signal that will be transmitted through network 110. In addition to the voice signal, any noise, such as background noise, present in the calling party's vicinity is also transmitted through network 110. Likewise, voice signals and noise signals are also transmitted through network 110 in the reverse direction, from called party 104 to calling party 102. A conversation thus begins between calling party 102 and called party 104. At certain times during the conversation, calling party 102 will not be sending a voice signal. The noise signal, however, is continually present and continues to be transmitted.

One embodiment of the present invention is as follows. Access network 106 and egress network 108 include a VAD/SS device. The VAD/SS device determines when a voice signal is present and when a voice signal is not present as is known in the art. For example, access network 106 monitors the energy of the input signal received. A certain energy pattern (e.g., level and frequency) is associated with a voice signal and a certain energy pattern is associated with a noise only signal. Vendors use proprietary methods for distinguishing between voice and noise only signals.

When the voice signal is not present, the VAD/SS device instructs a packet representing the noise signal to be created. The noise packet contains a sample of the actual noise signal, as opposed to approximate characteristics of the noise. The noise packet is transmitted through network 110 to egress network 108. Egress network 108 is instructed to convert the noise packet into an output noise signal and to continually transmit the output noise signal to called party 104 until a voice signal is present.

In order to prevent clipping of the input voice signal, the VAD/SS method monitors the input signal for voice for a period of time after the voice input ceases, referred to as a hang-over time. In other words, when the voice signal is not present in the input signal, and noise is the only input signal, the VAD/SS device continues to transmit the packetized noise signal through network 110 for an extra period of time. This methodology ensures that there is no voice signal being input, as opposed to a small pause, for example. As a result, this methodology prevents the called party from hearing the calling party's voice cut in an out, so that called party does not miss the beginning portion of voice signals from the calling party.

In an alternate embodiment of the present invention, egress network 108 extracts and stores noise packets from the received voice signal. In a typical conversation, calling party 102 is not sending a continuous voice signal to called party 104. There are natural breaks or pauses in the voice signal when only a noise signal is being transmitted. During these portions of time when no voice, and only noise is being transmitted to egress network 108, egress network 108 extracts and stores noise packets. When egress network 108 is informed by access network 106 that there is no voice signal being transmitted through network 110, egress network 108 converts the stored samples of the actual noise to an output noise signal and continually transmits the output noise signal to called party. When an input voice signal is again received at egress network 108, the transmission of the stored noise signal to called party ceases and the input voice signal is transmitted to the called party as described above.

Although the present invention has been described as calling party 102 initiating the input voice signal and called party 104 received the voice signal, one skilled in the art will appreciate that called party 104 also initiates voice signals that are received by calling party 102.

Although embodiments of the present invention are illustrated in the accompanying Figures and are described in this Detailed Description, it is understood that the present invention is not limited to these embodiments, but is capable of numerous arrangements, modifications, and substitutions without departing from the spirit or scope of the invention as defined in the claims. Various modifications and adaptations of the present invention will be apparent to persons skilled in the art.

What is claimed is:

1. A computer-implemented method for silence suppression during a call, the method causing a computing device to perform steps comprising:
   receiving, via an access gateway, an input voice signal and a background noise signal;
   converting, via the access gateway, the input voice signal into a packetized voice signal and the background noise signal into a packetized noise signal; and
   receiving the packetized voice signal and the packetized noise signal via an egress gateway, outputting an output voice signal converted from the packetized voice signal and extracting and storing noise packets from the received packetized noise signal via the egress gateway,
   wherein when the access gateway ceases to receive the input voice signal while the call is still ongoing, the access gateway instructs the egress gateway to continually output an output noise signal generated from the stored noise packets.

2. The computer-implemented method of claim 1, wherein the access gateway ceases to receive the input voice signal for a predefined hang-over time prior to instructing the egress gateway to continually output the output noise signal.

3. The computer-implemented method of claim 1, wherein the voice signal and noise signal are received over a Voice over Internet Protocol (VoIP) network.

4. The computer-implemented method of claim 1, wherein the voice signal and noise signal are received over a Voice over Frame network.

5. The computer-implemented method of claim 1, wherein the voice signal and noise signal are received over a Voice over ATM network.

6. The computer-implemented method of claim 1, wherein the input voice signal is received from a speaking party and the output voice signal and output noise signal are output to a listening party.

7. A non-transitory computer-readable storage medium storing instructions which, when executed by a computing device, cause the computing device to perform steps comprising:
   receiving, via an access gateway, an input voice signal and a background noise signal;
   converting, via the access gateway, the input voice signal into a packetized voice signal and the background noise signal into a packetized noise signal; and
   receiving the packetized voice signal and the packetized noise signal via an egress gateway, outputting an output voice signal converted from the packetized voice signal and extracting and storing noise packets from the received packetized noise signal via the egress gateway,
   wherein when the access gateway ceases to receive the input voice signal while the call is still ongoing, the access gateway instructs the egress gateway to continually output an output noise signal generated from the stored noise packets.

8. The non-transitory computer-readable storage medium of claim 7, wherein the access gateway ceases to receive the input voice signal for a predefined hang-over time prior to instructing the egress gateway to continually output the output noise signal.

9. The non-transitory computer-readable storage medium of claim 7, wherein the voice signal and noise signal are received over a Voice over Internet Protocol (VoIP) network.

10. The non-transitory computer-readable storage medium of claim 7, wherein the voice signal and noise signal are received over a Voice over Frame network.

11. The non-transitory computer-readable storage medium of claim 7, wherein the voice signal and noise signal are received over a Voice over ATM network.

12. The non-transitory computer-readable storage medium of claim 7, wherein the input voice signal is received from a speaking party and the output voice signal and output noise signal are output to a listening party.

13. An access gateway configured to provide noise processing for a call, the access gateway configured to interface with an egress gateway that converts an input voice signal into a packetized voice signal and converts a background noise signal into a packetized noise signal, the access gateway comprising:
   a processor;
   a first module controlling the processor to receive an input voice signal and a background noise signal; and
   a second module controlling the processor to instruct the egress gateway to continually output an output noise signal generated from the stored noise packets when the first module ceases to receive the input voice signal while the call is still ongoing.

14. The access gateway of claim 13, wherein the egress gateway ceases to receive the input voice signal for predetermined hang over time prior to the egress gateway continually outputting the output noise signal.

15. The access gateway of claim 13, wherein the access gateway uses at least one of VoIP technology, Voice over Frame technology and Voice over ATM technology.

16. The access gateway of claim 13, wherein the first module controls the processor to receive the input voice signal from a speaking party and the second module instructs the egress gateway to output the voice signal and output noise signal to a listening party.

* * * * *

UNITED STATES PATENT AND TRADEMARK OFFICE
CERTIFICATE OF CORRECTION

PATENT NO. : 8,112,273 B2
APPLICATION NO. : 12/647863
DATED : February 7, 2012
INVENTOR(S) : James H. James and Joshua Hal Rosenbluth It is certified that error appears in the above-identified patent and that said Letters Patent is hereby corrected as shown below:

In the Claims:

Column 5, line 25, "the voice signal and noise signal" should be changed to --the packetized voice signal and the packetized noise signal--;

line 28, "the voice signal and noise signal" should be changed to --the packetized voice signal and the packetized noise signal--;

line 31, "the voice signal and noise signal" should be changed to --the packetized voice signal and the packetized noise signal--;

line 35, "output noise signal" should be changed to --the output noise signal--;

Column 6, line 2, "the call" should be changed to --a call--;

line 12, "the voice signal and noise signal" should be changed to --the packetized voice signal and the packetized noise signal--;

line 15, "the voice signal and noise signal" should be changed to --the packetized voice signal and the packetized noise signal--;

line 18, "the voice signal and noise signal" should be changed to --the packetized voice signal and the packetized noise signal--;

line 22, "output noise" should be changed to --the output noise--;

line 35, "the stored noise packets" should be changed to --stored noise packets--;

line 48, "output noise" should be changed to --the output noise--.

Signed and Sealed this
Twentieth Day of May, 2014

Michelle K. Lee
*Deputy Director of the United States Patent and Trademark Office*